April 7, 1936.  J. W. HUME  2,036,757
ADJUSTABLE BALANCER FOR VEHICLE WHEELS
Filed Dec. 3, 1932
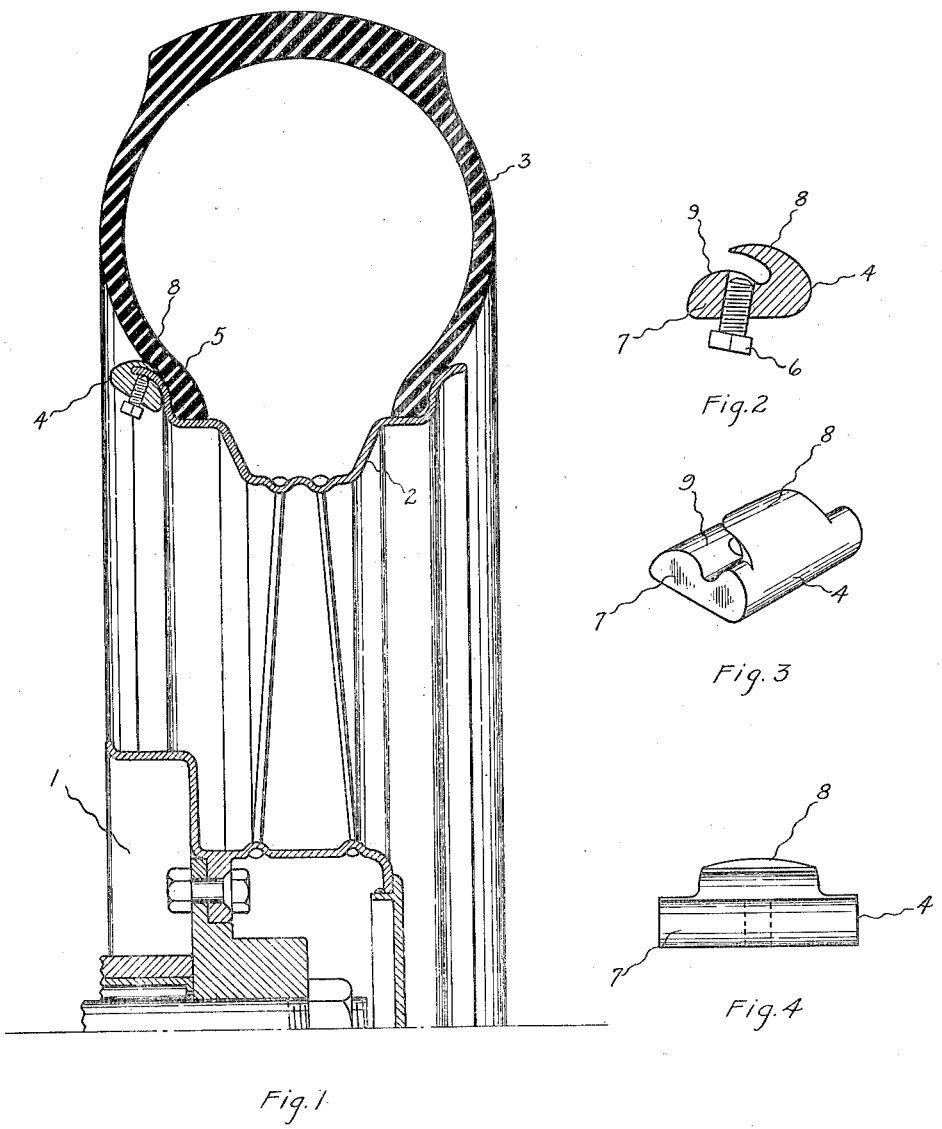
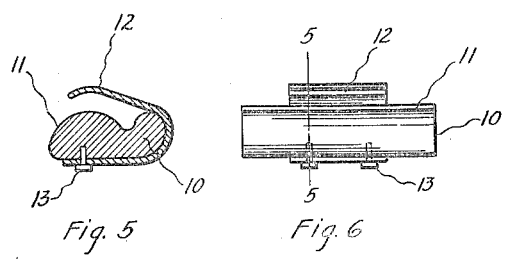
Inventor
James W. Hume
by Edmund F. Beaman
Attorney Patented Apr. 7, 1936

2,036,757

UNITED STATES PATENT OFFICE 2,036,757

ADJUSTABLE BALANCER FOR VEHICLE WHEELS

James W. Hume, Jackson, Mich.

Application December 3, 1932, Serial No. 645,504

12 Claims. (Cl. 301—5)

The present invention relates to an improvement in the balancing of vehicle wheels provided with a pneumatic tire.

At the present time, the increasing speed at which motor vehicles are driven has resulted in the necessity of dynamically balancing the wheels. It is not enough to attempt to balance the wheel, rim, and tire, constituting the complete unit, during the fabrication thereof, but it is necessary to balance the entire assembly thereafter upon its axis of rotation. Shifting of the rim during the rolling action resulting in variation in thickness of the flanges; welding of the rims; variation in tire construction; and the concentrated weight of the valve stem of the inner tube are some of the factors which result in unbalanced wheel assemblies and have to be overcome.

Heretofore attempts have been made to balance the wheel assembly by removing material from certain localities and adding material in other localities. These attempts for the most part have been cumbrous, expensive, and ineffective and to my knowledge are either of a permanent character or are limited to a particular and specified point of application and lack any degree of flexibility and ease of installation.

It becomes the primary object of my invention, therefore, to provide a balancing mass for vehicle wheels of the pneumatic tire type, which is inexpensive, effective and may be readily and adjustably positioned along the flange of the wheel rim to balance the wheel, rim, and tire assembly.

Other objects and advantages will appear as the description progresses. It is to be clearly understood, however, that I do not desire to be limited to the exact details hereinafter set forth but intend to include as part of my invention all such changes and modifications as would occur to those skilled in the art and fall within the scope of the appended claims.

In the accompanying drawing wherein one preferred embodiment of my invention is set forth for the purpose of illustration, Fig. 1 is a partial cross sectional view of a vehicle wheel and tire showing my improved balancer in position.

Fig. 2 is an enlarged cross sectional view of my balancer as shown in Fig. 1.

Fig. 3 is a prospective view of my improved balancer.

Fig. 4 is a front elevation of the balancer shown in Fig. 3.

Fig. 5 is a cross sectional view of a modified form taken on line 5—5 of Fig. 6.

Fig. 6 is a front elevation of a modified form.

In carrying the present invention into practice, balancing masses preferably of non-ferrous metal, having relatively high specific gravity, are casted, molded, machined or otherwise fabricated into a relatively thick body portion having an upper surface conforming to the contour of the under side of the rim flange and a thin integral lip portion embraces the edge of the flange and projects along the inner face of the rim flange when in position. Set screws or the equivalent, are preferably employed to adjustably secure the balancing mass in position along the edge of the rim flange. The construction of the lip portion of the balancer is such that the side wall of the pneumatic tire adjacent the tire bead materially assists in retaining the same in position when the tire is inflated. In the balancing of the wheel, rim, and tire assembly it may be necessary to employ a plurality of balancing instrumentalities in order to bring the assembly within the limits desired. In the modification shown the thick body portion is preferably of extruded metal and the same is retained in position by a spring steel clip.

Having specific reference to the drawings, a wire wheel 1 of the usual construction is shown as having a dropped center rim 2 upon which the usual pneumatic tire 3 is mounted. My improved balancer 4 is shown slidably received upon the flange 5 of the rim 2 and is adjustably locked in position by set screw 6 located in the body portion 7. Upon tightening of the screw 6, a thin lip 8 engaging the edge of the flange 5 is drawn down and clamped against the inner face of the flange of the rim. The upper side of the lip 8 is beveled to provide but slight interference to the wall of the tire adjacent the tire bead, which aids materially, upon inflation, in retaining the balancer in position. Preferably, the upper side 9 of the body portion 7 conforms to the contour of the flange 5. Also, the threaded aperture in the body 7 receiving the screw 6 is preferably slightly inclined in order to draw the lip 8 inwardly against the edge of the flange 5. Obviously, the balancer 4 is adapted to be used upon the flange of a demountable rim as well as upon the type illustrated.

To balance a wheel assembly, the tire is partially deflated and the balancer 4 is inserted upon the edge of the rim flange and slides around until the wheel is balanced upon its axis of rotation; it is then fixedly secured in position by tightening the set screw 6 and inflating the tire. If necessary, a plurality of balancers 4 may be spaced and/or grouped around the rim flange to correctly balance the assembly. The ability to slide the balancer in either direction along the flange greatly facilitates the balancing operation. To prevent the balancer from detracting from the symmetrical appearance of the vehicle wheel, the balancers are preferably located on the inside rim flange.

Although my improved balancer is primarily designed to be readily removable and adjustable to permit rebalancing of the wheel assembly upon replacement of the tires or unequal wear of the same, I anticipate the permanent welding or otherwise affixing of my balancer in position with the elimination of the set screw 6.

In the modification shown in Figs. 5 and 6, the set screw has been eliminated by employing a thick body portion 10, preferably of extruded metal, having a contour surface 11 conforming to the contour of the under side of the rim flange. A resilient U-shape clip 12 is secured at one end to the under side of the body 10 by suitable fastening means 13, preferably by escutcheon pins. The overhanging of the lip portion of the clip 12, is substantially greater than that of the corresponding lip 3, to enable the flange to be clamped further from the edge thereof and permit the walls of the inflated tire to contact with a greater portion of the clip in assisting the fixation of the balancer to the rim.

Having thus described my invention, what I claim as new and desire to protect by Letters Patent is:

1. A balance weight for the balancing of pneumatic tired vehicle wheels, said weight being adapted to be removably received upon the peripheral edge of the tire rim flange and comprising a body portion and an overhanging lip portion, said weight being of a configuration capable of straddling said peripheral edge with the body portion contiguous with the outer side of the rim flange, said lip portion substantially conforming to the contour of the inner side of said rim flange adjacent said edge, and means located in said body portion for clamping said lip portion upon the edge of said flange.

2. A balance weight for the balancing of pneumatic tired vehicle wheels, said weight being adapted to be removably secured upon the peripheral edge of the tire rim flange and comprising a thickened body portion and a relatively thin overhanging lip portion, said weight being of a configuration capable of straddling said peripheral edge with the thickened body portion contiguous with the outer side of the rim flange, said lip portion substantially conforming to the contour of the inner side of said rim flange adjacent said edge and of sufficient length to extend inwardly a sufficient distance to be gripped between the side wall of the tire and rim flange when the tire is inflated whereby said weight is at least partially held in position by said tire, and means located in said body portion for clamping said lip portion upon the edge of said flange.

3. A balance weight for the balancing of pneumatic tired vehicle wheels, said weight being adapted to be removably secured upon the peripheral edge of the tire rim flange and consisting of a thickened body portion having a relatively thin overhanging lip portion integral therewith, said weight being of a configuration capable of straddling said peripheral edge with the thickened portion contiguous with the outer side of the rim and extending inwardly from said edge, said lip being located along one side of said body portion and embracing said peripheral edge when in position, said lip substantially conforming to the contour of the inner side of said rim flange adjacent said edge and of sufficient depth to extend inwardly overhanging said body a sufficient distance to be gripped between the side wall of the tire and rim flange when the tire is inflated, and means located in said body portion for clamping said lip upon the edge of said flange.

4. In combination, a vehicle wheel comprising a rim having tire retaining flanges, a pneumatic tire mounted upon said rim, a balancing weight for balancing said tire and wheel removably secured to the peripheral edge of one of said flanges, said weight having a thickened body portion and a relatively thin lip portion, said weight straddling said peripheral edge with the body portion contiguous with the outer side of said flange, said lip portion substantially conforming to the contour of the inner side of said flange adjacent said edge, and adjustable means located in said body for clamping said lip portion upon the edge of said flange.

5. In combination, a vehicle wheel comprising a rim having tire retaining flanges, a pneumatic tire mounted upon said rim, a balance weight for balancing said tire and wheel positionably along and removably secured to the peripheral edge of one of said flanges, said weight having a thickened body portion and a relatively thin lip portion, said weight straddling said peripheral edge with the body portion contiguous with the outer side of said flange, said lip portion substantially conforming to the contour of the inner side of said flange adjacent said edge and extending inwardly a sufficient distance to be gripped between the side wall of said tire and rim flange when the tire is inflated whereby said weight is at least partially held in position by said tire, and means for clamping said lip portion upon the edge of said flange.

6. In combination, a vehicle wheel comprising a rim having tire retaining flanges, a pneumatic tire mounted upon said rim, a balance weight for balancing said tire and wheel positionably along and removably secured to the peripheral edge of one of said flanges, said weight having a thickened body portion and a relatively thin attachment portion, said body and attachment portions being of a configuration enabling said weight to be arranged upon said edge to straddle the same, said attachment portion embracing said edge and being contiguous with the side wall of said tire, and means for clamping said attachment portion upon the edge of said flange.

7. In combination, a vehicle wheel comprising a rim having tire retaining flanges, a pneumatic tire mounted upon said rim, a balance weight for balancing said tire and wheel positionably along and removably secured to the peripheral edge of one of said flanges, said weight having a body portion contiguous with the outer side of said flange, an attachment portion associated with said body portion, said attachment portion embracing said peripheral edge and being gripped between the inner side of said rim flange and the side wall of said tire when the tire is inflated to retain the weight in position.

8. A balancing instrumentality for vehicle wheels adapted to be secured along the tire rim flange comprising a thickened body and a relatively thin resilient lip portion, the configuration of said portion enabling said instrumentality to be clipped upon the edge of said flange, said lip portion in position being adjacent the tire wall and adapted to resiliently clamp said body portion on the outside of the flange.

9. In combination, a vehicle wheel comprising a rim having tire retaining flanges, a pneumatic tire mounted upon said rim, a balance weight for balancing said tire and wheel adapted to be secured upon the peripheral edge of one of said flanges, said weight having a thickened body portion and a relatively thin attachment portion, said body and attachment portions being of a configuration enabling said weight to be arranged upon said edge to straddle the same, said attachment portion embracing said edge and being contiguous with the side wall of said tire, and means for securing said weight upon said flange.

10. A balance weight for the balancing of pneumatic tired vehicle wheels, said weight being adapted to be removably secured upon the peripheral edge of the tire rim flange and comprising a thickened body portion and a relatively thin overhanging lip portion, said weight being of a configuration capable of straddling said peripheral edge with the thickened body portion contiguous with the outer side of the rim flange, said lip portion substantially conforming to the contour of the inner side of said rim flange adjacent said edge and of sufficient length to extend inwardly a sufficient distance to be gripped between the side wall of the tire and rim flange when the tire is inflated whereby said weight is at least partially held in position by said tire.

11. A balancing instrumentality for vehicle wheels adapted to be secured along the tire rim flange comprising a thickened body and a relatively thin resilient lip portion, the configuration of said portion enabling said instrumentality to be clipped upon the edge of said flange, said lip portion in position being adjacent the tire wall and adapted to resiliently hold said body portion on the outside of the flange.

12. For balancing a wheel having a tire carrying rim with an outwardly extending flange, clip means elastically engaging the flange, and a weight carried by the clip.

JAMES W. HUME.